Figure 1:
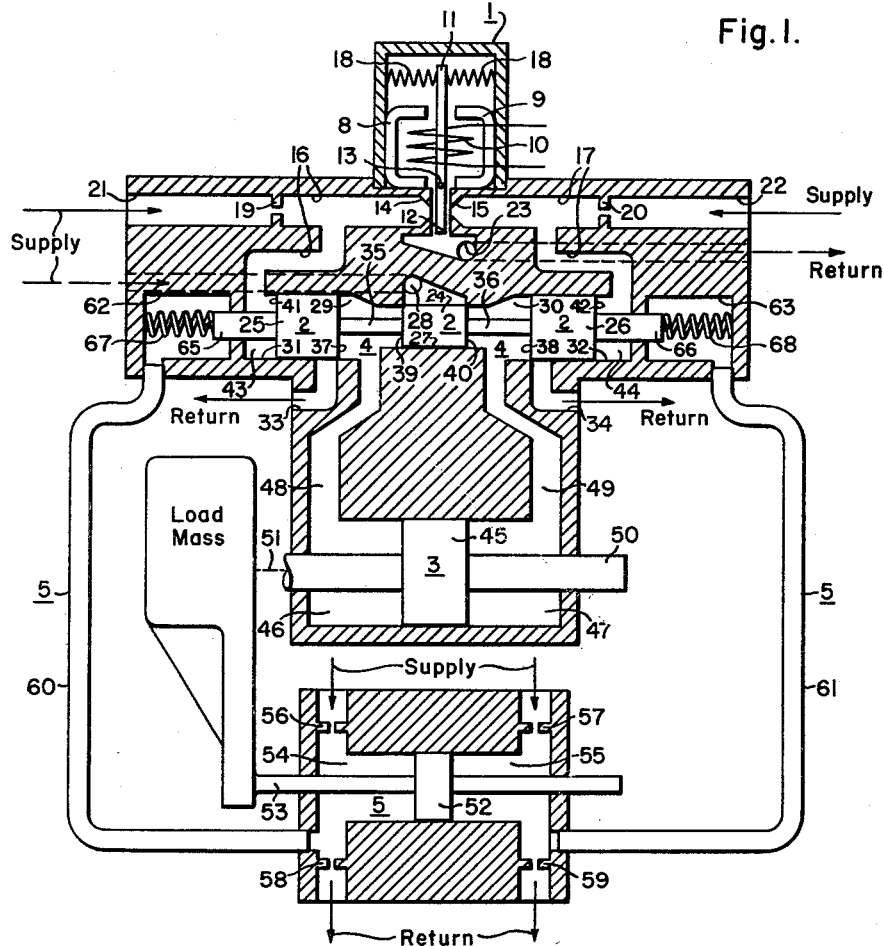

Nov. 21, 1961    W. B. LLOYD    3,009,447
PRESSURE AND VELOCITY FEEDBACK SERVO VALVE
Filed June 19, 1959    2 Sheets-Sheet 1

INVENTOR
Wayne B. Lloyd
ATTORNEY

United States Patent Office 3,009,447
Patented Nov. 21, 1961

3,009,447
PRESSURE AND VELOCITY FEEDBACK
SERVO VALVE
Wayne B. Lloyd, Catonsville, Md., assignor to Westinghouse Electric Corporation, East Pittsburgh, Pa., a corporation of Pennsylvania
Filed June 19, 1959, Ser. No. 821,509
5 Claims. (Cl. 121—41)

This invention relates generally to servo valve mechanisms, and more particularly to a new and useful servo valve mechanism adapted to employ hydraulic fluid and to be controlled by an electric signal.

The present invention is primarily concerned with the provision of a servo valve system wherein an input signal or force is converted to a proportional velocity of a load mass through the medium of hydraulically-operated actuator means.

Prior art servo valve systems have employed flow control valves actuated by such as an electric torque motor to deliver to a load actuator a flow of hydraulic fluid nominally proportional to the force output from such torque motor. In such a system the flow of hydraulic fluid to the load actuator tends to be independent of the pressure differential across such actuator, hence the term "flow control" is applied to such valves. In low performance systems or in systems having negligible inertia, the proportionality between flow of hydraulic fluid to the load actuator and the actuator output velocity may hold up dynamically over the region of interest; however, in high performance inertia-loaded systems the proportionality between valve output flow to the actuator and actuator velocity breaks down because a portion of the flow is absorbed by the compliance due to oil compressibility within the actuator and control lines and to the resiliency of the linkage between the actuator and the load. The result is a tendency for the system to oscillate and thereby limit its employment in a closed loop arrangement. A typical inertia-loaded servo system having a resonance due to oil compliance of 20 cycles per second would have a closed loop response of about 10 cycles per second, depending on damping of the resonance. Such a servo system employing flow control valve means, however, would have excellent friction rejecting characteristics, due to the high pressure gain inherent in such system, i.e., the relatively high differential pressures created across the actuator relative to the input pressure supplied thereto via the flow control valve means.

In behalf of overcoming limitations imposed on closed loop operation of servo valve systems employing flow control valves, due to the compliance of the hydraulic fluid employed in such systems, pressure control or pressure feedback valves were developed for employment in such systems. A typical valve of this type is disclosed in U.S. Patent 2,889,815, titled "Pressure Feedback Servo Valve" by Wayne B. Lloyd, filed July 20, 1956 and assigned to the assignee of the present application. Pressure feedback in such a system controls the differential pressure developed across the load actuator for a given control input to the valve under dynamic conditions. Since pressure, rather than flow, is controlled dynamically, this type of valve is able to overcome the limitation of compliance of the hydraulic fluid and of the linkage connecting the load actuator to the load. By employment of a valve of this type, a system having a 20 cycle per second resonance would be capable of a closed loop response of 20 cycles per second or higher; however, while such a system is of considerable utility, this system is susceptible to errors due to load or actuator friction because of an inherent low pressure gain in valves of this type.

Accordingly, it is a primary object of this invention to provide a servo valve system which is capable of the performance of the system employing pressure feedback valve means of the above type, with improved characteristics which lessen susceptibility to errors due to load or actuator friction.

A further object of the invention is to provide a servo valve system which will respond to establish a load velocity upon dictates of an input signal in a lesser period of time than heretofore has been possible.

Another object of the invention is to provide an electrohydraulic servo valve system which establishes load velocities more nearly linearly proportional to its input control condition than heretofore has been possible.

Figure 2:
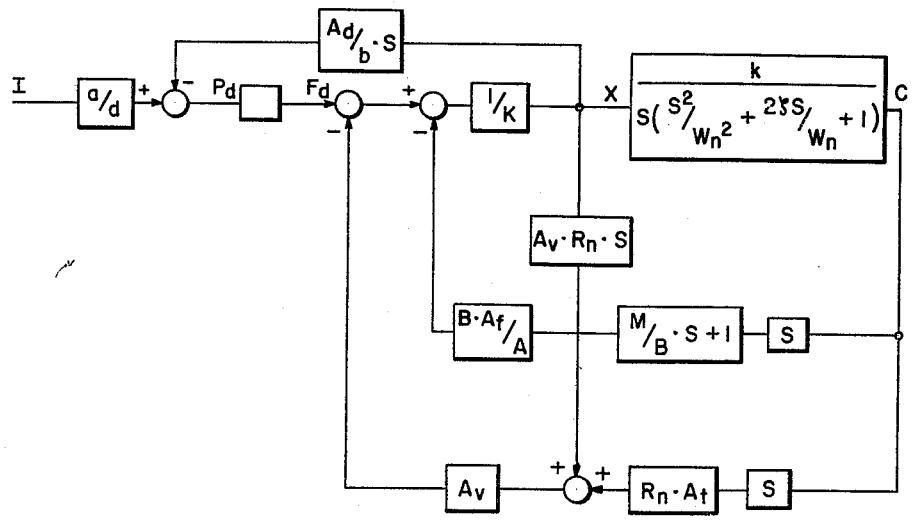
Figure 3:
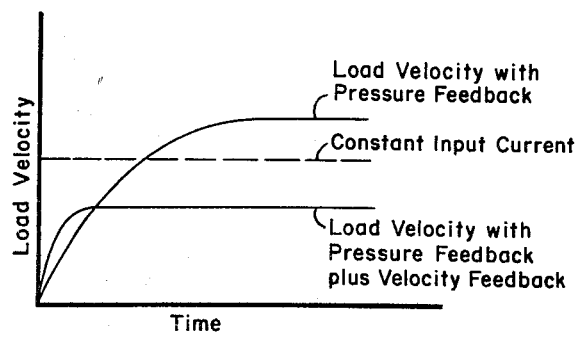

Other objects and advantages of the invention will become apparent from the following description thereof when taken in connection with the accompanying drawings, in which:

FIGURE 1 is a schematic representation of a servo valve system embodying the invention;

FIG. 2 is a block diagram of the system illustrating mathematical relationships which may be employed for design and analysis of operation of the system; and FIG. 3 illustrates a comparison between the load velocity resultant from a high performance servo system employing a pressure feedback valve means of the type such as disclosed in the aforementioned Patent 2,889,815, in comparison with the load velocity resultant from applicant's servo valve system employing pressure and velocity feedback valve means.

Referring now to FIG. 1 in the accompanying drawings which illustrate a preferred embodiment of the invention, the novel servo valve system is broadly characterized by torque motor means 1 which is responsive to an input control current to establish a fluid pressure condition for operation of a valve means 2 which in turn establishes a pressure condition in an actuator means 3 for effecting movement of a load mass to establish a velocity thereof in proportion to the control current supplied to the aforesaid torque motor means 1. In accord with the invention, the novel servo valve system comprises pressure feedback means 4 associated with the valve means 2 and with the actuator means 3 to modify operation of such valve means according to pressure conditions established in said actuator means to prevent hunting or oscillation of the system by compensating for the compliance of the hydraulic fluid in the system as well as the compliance of the mechanical members of such system; together with velocity feedback means 5 associated with the valve means 2 and with the load mass to modify operation of such valve means according to velocity of said load mass to obtain, in conjunction with operation of said pressure feedback means 4, an improved ability of the system to override load friction and to obtain a certain desired velocity of the load mass proportionate to control current supplied to the torque motor means 1 in a lesser period of time than heretofore has been possible by employment of pressure feedback means alone.

For the sake of illustration, the system is adapted for electrical control by inclusion of the torque motor means 1 which essentially may comprise oppositely-arranged pole pieces 8 and 9 adapted to be energized by a control winding 10 for actuating an armature 11 in one direction or the other according to the direction of current supplied to the control winding 10 to pivotally move a flapper valve 12 about a pivot point 13 toward and away from oppositely-arranged nozzle members 14 and 15 to establish a pressure differential in servo valve control conduits 16 and 17. The armature 11 of the torque motor means 1 is biased toward a neutral position by control spring means 18, in which position the flapper valve 12 is disposed equidistant to the nozzle members 14 and 15 for equality of fluid pressure in the control conduits 16 and 17. The spring means 18 is such that deflection of the armature 11 is opposed by pickup of such spring means so that a given degree of energization of the control winding 10 will effect a corresponding degree of angular movement of such armature together with the flapper valve 12 for establishing a corresponding pressure differential in control conduits 16 and 17. Upon deenergization of the control winding 10, the spring means 18 will return the armature 11 and flapper valve 12 to the respective neutral positions in which they are shown in the drawing.

The servo valve control conduits 16 and 17 are constantly availed of fluid under pressure from a source (not shown) such as a hydraulic pump and accumulator system, by way of respective flow restricting elements 19 and 20 and fluid pressure supply ports 21 and 22. During operation of the valve system, hydraulic fluid under pressure is in constant flow by way of the supply ports 21 and 22, flow restricting elements 19 and 20, and the control conduits 16 and 17 through the nozzles 14 and 15, past the flapper valve 12 to a return conduit 23, common to each nozzle, thence to a return sump associated with the source of fluid under pressure (not shown). The rocking movement of the flapper valve 12 toward one or the other of the nozzles 14 and 15 as effected by operation of the torque motor means 1 establishes relative degrees of restriction of such nozzle means to thereby establish a differential in pressure of fluid in the control conduits 16 and 17. Preponderance in pressure in one of the conduits 16 and 17 over that in the other is determined by the direction of movement of the flapper valve 12. The flapper valve 12, nozzles 14 and 15, control conduits 16 and 17, flow-restricting elements 19 and 20, and fluid pressure supply ports 21 and 22 may be considered to constitute the first stage of what may be referred to as a two-stage servo valve arrangement.

The valve means 2 may be considered to be the second stage of such two-stage servo valve mechanism and as such comprises supply control valve means in the form of a center land 24 for controlling supply of fluid under pressure to opposite sides of the actuator means 3, and release control valve means in the form of oppositely-arranged lands 25 and 26 for controlling release of hydraulic fluid under pressure from opposite sides, respectively, of such actuator means 3. The center land 24 or supply control valve means for the actuator means 3 is slidably mounted in a suitable bore 27 for cooperation with a fluid pressure supply port 28 to control selective communication between such supply port and delivery chambers 29 and 30 within the bore 27 and at opposite ends of such center land, as well as to control the degree of opening of such delivery chambers to supply port 28. The supply port 28 is also connected to the source of hydraulic fluid under pressure (not shown), and the center land 24 substantially spans such supply port so that in neutral position of such center land, in which position it is shown in the drawing, every little, if any, hydraulic fluid will flow from such supply port to the delivery chambers 29 and 30, while slight movement of the center land in the direction of one or the other of such delivery chambers will effect opening of the supply port 28 to one or the other of such chambers according to the direction of such movement.

The oppositely-arranged lands 25 and 26, as constituting the release control valve means for the actuator means 3, are slidably disposed in respective bores 31 and 32 for cooperation with release ports 33 and 34, respectively, opening radially into such bores. The oppositely-arranged lands 25 and 26 are attached to the center land 24 for operation in unison therewith through the medium of oppositely-arranged stems 35 and 36 extending through chambers 29 and 30, respectively. The release ports 33 and 34 are each connected to the aforementioned return sump associated with the fluid pressure supply means (not shown), and each of such release ports is arranged relative to its respective land 25 and 26 such that in the neutral position of such lands, in which positions they are shown in the drawing, these release ports will be covered, while upon movement of one or the other of such lands 25, 26 in the direction away from its adjacent delivery chamber 29, 30 the respective release port 33, 34 will be open to such delivery chamber while the opposite release port 33, 34 remains closed by its respective land 25, 26.

In accord with a structural feature of the invention, the lands 25 and 26, hence the bores 31 and 32, are of larger diameter than that of the center land 24 to provide respective annular end faces 37 and 38 in exposure to delivery chambers 29 and 30, respectively, of greater area than annular end faces 39 and 40 of the center land 24 exposed to such delivery chambers, respectively. As hereinafter will become apparent, the differential in areas between annular end faces 37 and 39 and between 40 and 38 provides for introduction into the valve means 2 of a pressure feedback relationship with respect to the actuator means 3.

For input control actuation of the spool assemblage as including the oppositely-arranged lands 25 and 26 together with the center land 24, the bores 31 and 32 are enclosed for cooperation with annular end faces 41 and 42 of such lands 25 and 26, respectively, to define control chambers 43 and 44, respectively, which are constantly open to the servo valve control conduits 16 and 17, respectively.

The actuator means 3 is preferably in the form of a cylinder device having a piston member 45 disposed therein and subject opposingly to pressure of fluid in actuator chambers 46 and 47 at its opposite sides. The piston member 45 may be of the type shown in the drawings which is linearly movable, or of a rotary type (not shown) without departing from the spirit and scope of the invention. Actuator chambers 46 and 47 are constantly open to the delivery chambers 29 and 30, respectively, of valve means 2 by way of conduits 48 and 49, respectively. The piston means 45 is mechanically connected to the load mass through the medium of a piston rod 50, or shaft as in the case of a rotary piston, and a linkage 51 which may exhibit a significant degree of compliance indicated in the drawing by a dot and dash line continuing from such piston rod. The linkage 51 may be part of the rod 50 and not necessarily intended to be compliant, but compliance is an inherent characteristic of most linkages, and is usually present to a relatively high degree in linkages employed on aircraft where rigidity may be sacrificed in behalf of weight reduction.

The pressure feedback means 4 may be considered to be constituted by the annular end faces 37 and 38 of lands 25 and 26, respectively, together with the conduits 48 and 49 which convey to these end faces the pressure conditions existent in actuator chambers 46 and 47 at opposite sides of the piston member 45. In the illustrative embodiment of the invention as shown in FIG. 1, it is essential that such end faces 37 and 38 be of greater area than that of annular end faces 39 and 40 of the center land 24, however, it should be understood that it is within the skill of the art to provide for location of such pressure feedback responsive surfaces as constituted by end faces 37 and 38 in other manners, without departing essentially from the present arrangement.

In accord with other structural details of the invention, the velocity feedback means 5 includes means in the form of a piston member 52 for creating pressure conditions according to the rate or velocity of movement of the load mass. Where the load mass is actuated linearly by motor means 3 of the linear type as shown in the drawing, the piston member 52 will be of the linear type of which it also is shown in the drawings. Where, however, movement of the load mass is rotary, as may be effected by a motor means 3 in rotary from (not shown) the piston member 52 also will be of a rotary form (not shown). In either form, linear or rotary, the piston member 52 is operably connected to the load mass independently of the compliant linkage 51 directly through the medium of a driving member 53 which, in the case of the linear piston member 52 as shown in the drawing, will be in the form of a piston rod, and in the case where such piston member is rotary, such driving member 53 may be in the form of a rotary shaft (not shown). In the illustrative embodiment of the invention as shown in FIG. 1, linear movement of the piston member 52 creates a pressure condition representative of the rate of movement of the load mass by virtue of exposure of such piston member to pressure chambers 54 and 55 at its opposite sides which are constantly open to the high pressure or supply side of the source of fluid under pressure (not shown) by way of flow restricting elements 56 and 57, respectively, and to the return or low pressure side of the source of fluid under pressure (not shown) by way of flow restricting elements 58 and 59, respectively. To communicate such pressure conditions in chambers 54 and 55 to the valve means 2, the velocity feedback means 5 includes conduits 60 and 61, respectively. To render such pressure conditions established in conduits 60 and 61 effective to influence the valve means 2, the velocity feedback means 5 includes means defining oppositely-arranged velocity feedback pressure chambers 62 and 63 which are constantly open to such conduits 60 and 61, respectively, to impose a load velocity pressure condition on the projecting ends of velocity feedback piston members 65 and 66, respectively, which are attached to the lands 25 and 26, respectively, of the valve means 2 and extend into such chambers 62 and 63, respectively. Control bias and centering or return springs 67 and 68 for the valve assemblage including velocity feedback piston members 65 and 66, oppositely-arranged lands 25 and 26, and the center land 24, are disposed, for sake of convenience, in the velocity feedback pressure chambers 62 and 63, respectively.

OPERATION

Referring to FIG. 1 in the drawing, in operation of the novel servo valve system embodying the invention, assume that the supply ports identified as such in the drawing are connected to the output or high pressure side of the source of fluid under pressure (not shown) and that the return ports, identified as such in the drawing, are connected to the return or low pressure side of such source of fluid under pressure. Assume also that the control winding 10 of the torque motor means 1 is deenergized.

Under such conditions, the armature 11 and attached flapper valve 12 will occupy their respective neutral positions in which they are shown in the drawing, under the influence of the control spring means 18. The flapper valve 12 will be disposed equidistant from the nozzles 14 and 15 so that equal flow of hydraulic fluid will occur by way of the flow restricting elements 19 and 20, control conduits 16 and 17, such nozzles 14 and 15, and the return conduit 23 back to the supply source.

By virtue of such equal flow condition in the control conduits 16 and 17, pressure of hydraulic fluid therein, hence in control chambers 43 and 44 of valve means 2 will be equal, and hence, the valve assemblage including piston members 65 and 66 and lands 24, 25 and 26, will be in the neutral position in which it is shown in the drawing under influence of springs 67 and 68.

In such neutral position of the valve assemblage the delivery chambers 29 and 30 will be effectively closed off both to the suply port 28 by center land 24 and to the release ports 33 and 34 by the lands 25 and 26, respectively. Pressure of fluid in delivery chambers 29 and 30 of valve means 2, hence in actuator chambers 46 and 47, will be equal and at some value dependent upon the amount of leakage of hydraulic fluid under pressure from supply port 28 past the center land 24 and past the outer lands 25 and 26.

It may further be assumed that the load mass identified as such in the drawing occupies some neutral position and that therefore the piston member 45 therefore also occupies a neutral position in which it is shown in the drawing.

Correspondingly, the piston member 52 of the velocity feedback means 5 will occupy a neutral position in which it is shown in the drawing. Pressure of fluid in chambers 54 and 55, by virtue of equality in size of openings in flow restricting elements 56 and 57 and between 58 and 59, will be equal as therefore also will be the fluid pressures in velocity feedback pressure chambers 62 and 63 associated with the valve means 2.

So long as the flapper valve 12 is allowed to thus remain in its neutral position and the load mass is not moved by external forces, it will be appreciated that the various opposing faces of the valve assemblage in the valve means 2 will be exposed to an equality of pressure forces so that such valve means will remain stationary. For example, equal pressures in velocity feedback pressure chambers 62 and 63 in acting on the oppositely-arranged ends of piston members 65 and 66 will balance out, equal control pressures in control chambers 43 and 44 in acting on annular faces 41 and 42 of lands 25 and 26 will balance out, equal pressures in delivery chambers 29 and 30 in acting on annular faces 37 and 38 of lands 25 and 26 will balance out as also will such equal pressures in these delivery chambers acting on the opposite annular end faces 39 and 40 of the center land 24.

Assume now that the control current, proportional to establishment of the desired load velocity is admitted to the control winding 10 of the torque motor means 1 in a direction according to the direction of movement desired for the load mass. Through the medium of the armature 11, the flapper valve 12 will be actuated toward one or the other of the nozzles 14 and 15, according to the direction of current in the winding 10. In behalf of simplifying description of operation, assume that supply of direct control current to the winding 10 is such as to cause movement of the flapper away from the nozzle 14 and toward the nozzle 15 in degree according to the degree of such control current. The nozzle 14 will become relatively unrestricted while the nozzle 15 will become relatively restricted. Flow of hydraulic fluid in the control conduit 16 will pass with relative ease, while flow of hydraulic fluid admitted to the control conduit 17 will flow with less ease. As a result, pressure of fluid in the control conduit 16 will reduce to substantially the same extent that pressure of fluid is increased in the conduit 17. A preponderance in pressure thus will be established in the control chamber 44 in valve means 2 over that in the control chamber 43. A resultant force will be created on the valve assemblage by action of the pressure of fluid in chamber 44 on the annular face 42 of the land 26 which exceeds the opposing force of the lesser pressure of fluid in chamber 43 acting on the annular face 41 of land 25. As a result of these unequal forces, the valve assemblage will move toward the left as viewed in the drawing, causing the center land 24 to move beyond the right hand edge of the supply port 28 to admit hydraulic fluid under pressure from the respective supply port to the delivery chamber 30, thence to the conduit 49 and to the actuator chamber 47. At the same time, the land 25 is caused to uncover the delivery chamber 29 to the release port 33 to permit release of hydraulic fluid from the actuator chamber 46 to the respective return port by way of conduit 48, while the land 26 maintains the respective release port 34 closed. Pressure of hydraulic fluid in the actuator chamber 47 thus will be caused to increase over that in the actuator chamber 46 with the result that the load mass will be caused to move through the medium of the rod 50 and complaint linkage 51.

By virtue of the fact that the annular areas of end faces 37 and 38 of lands 25 and 26, respectively, are larger than the end faces 39 and 40 of the center land 24, the pressure of fluid in the delivery chambers 29 and 30, hence in actuator chambers 46 and 47, respectively, create pressure feedback forces acting on such lands 25 and 26 in opposition to the control pressures in chambers 43 and 44 acting on these lands. Ignoring, for sake of explanation, the effect of any velocity feedback pressure in chambers 62 and 63 acting on piston members 65 and 66, the pressure feedback forces in delivery chambers 29 and 30 acting on lands 25 and 26, respectively, tends to cause these lands, together with the center land 24 to assume an equilibrium position with respect to the supply port 28 and the release port 33 such that the differential in pressures in these two chambers is maintained substantially constant and in accord with the differential in pressures between control chambers 43 and 44.

The relationship between the control pressure in chamber 43 relative to the delivery pressure in chamber 29 and between the control pressure in chamber 44 relative to the delivery pressure in chamber 30 will depend upon the relationship between the annular area of face 41 of land 25 exposed to chamber 43 to the effective pressure feedback area of end face 37 of such land 25 in the one case and to the annular area of face 42 exposed to control pressure in chamber 44 relative to the effective area of end face 38 exposed to delivery pressure in chamber 30 in the other case. These area relationships may be proportioned as desired, according to the relationship which it is desired to establish between the level of the control pressures relative to the level of the delivery pressures.

To continue, however, the automatic maintaining of a particular pressure differential in delivery chambers 29 and 30 in accord with an established pressure differential between control chambers 43 and 44 acts in behalf of stabilizing operation of the servo valve mechanism in the presence of tendencies for the pressures of hydraulic fluid in the actuator chambers 46 and 47 to change due to compliance of the hydraulic fluid contained therein as well as to compliance of the compliant linkage 51 interposed between the piston member 45 and the load mass. It is apparent that any tendency for the piston member 45 to oscillate under the influence of such compliances is discouraged by virtue of the functioning of the pressure feedback feature in acting in behalf of maintaining the pressure differential in chambers 46 and 47 fixed in accord with the differential in control pressure in control chambers 43 and 44.

In the servo valve system of the aforementioned Patent 2,889,815, such automatic stabilization of pressure differential across the actuator piston member is employed in behalf of stabilizing operation of the system.

In the present servo valve system, prior to movement of the piston member 45 and actuation of the load mass, and in consequent absence of the differential in pressures between the velocity feedback pressure chambers 62 and 63, the pressure feedback feature of this system will act to limit the degree of pressure differential which will be established in the actuator chambers 46 and 47 responsively to establishment of a differential in control pressures established in the control chambers 43 and 44. However, as will be understood from subsequent description, whereas in the system of the previous Patent 2,889,215 a particular pressure differential established in the actuator pressure chambers 46 and 47 was limited according to that value which would prevent over-shooting of the piston member 45 and load mass while being accelerated under influence of such differential as maintained constant during the period of acceleration, the present system enables a higher pressure differential to be established in these pressure chambers during such period of acceleration by virtue of employment of the velocity feedback means 5 in conjunction with the pressure feedback means 4.

In the present system, a pressure differential is built up in the velocity feedback pressure chambers 62 and 63 which acts on the valve assemblage to oppose the effect of the control pressure differential in chambers 43 and 44, in conjunction with the opposition afforded by the pressure feedback action in delivery chambers 29 and 30. This is accomplished in the following manner, movement of the load mass effects corresponding movement of the piston member 52 of velocity feedback means 5, and such movement of the piston member 52 causes creation of a pressure differential in chambers 54 and 55 which varies substantially directly in proportion to the rate of movement of the load mass. Movement of the load mass and piston member 52 toward the left, as viewed in the drawing, for example, creates a reduced pressure in chamber 55 due to its increase in size at a rate greater than can be made up by flow of hydraulic fluid via flow restricting element 57 in behalf of maintaining the pressure in such chamber 55 constant, while pressure fluid in chamber 54 is caused to increase due to the reduction in size of such chamber at a rate greater than can be compensated for by exhaust of hydraulic fluid via the flow restricting element 58 in behalf of maintaining such pressure in chamber 54 constant. The differential in hydraulic pressures in chambers 54 and 55 will increase during acceleration of the load mass, an increasing preponderance in pressure of fluid in chamber 54 over that in chamber 55 building up as the load mass and piston member 52 accelerates in the left-hand direction as viewed in the drawing. Such increase in differential between the velocity feedback pressure chambers 62 and 63 in acting on the piston members 65 and 66 in opposition to the pressure differentials in control chambers 43 and 44 act, in conjunction with the feedback pressures in delivery chambers 29 and 30 to cause the valve assemblage to assume an equilibrium position for establishing a differential pressure in actuator chambers 46 and 47 of the actuator means 3 which is compatible with a certain desired velocity of the load mass corresponding to dictates of the differential pressure in chambers 43 and 44.

By virtue of the increased effectiveness of the velocity feedback means 5 on the valve means 2 with increase in velocity of the load mass, it will be apparent that by employment of both such velocity feedback means 5 in conjunction with the pressure feedback means 4, the load mass may be accelerated at a greater rate than heretofore with pressure feedback alone, without causing such load mass to over-shoot its desired velocity as established by the differential control pressure in chambers 43 and 44, see FIG. 3.

Furthermore, it will be apparent that since the piston member 52 of the velocity feedback means 5 is directly connected to the load mass in bypass of any compliant linkage such as the compliant linkage 51 connecting the motor means 3 to such load mass, the effect of the velocity feedback means 5 on the valve means 2 will be such as to tend to stabilize movement of the load mass once having attained its desired velocity, irrespective of any tendency for relative movement between such load mass and the piston member 45 of the actuator means 3, such as may be introduced due to compliance of the compliant linkage 51.

In view of the foregoing description, it will be apparent that the system will function in the same manner as described irrespective of the degree of preponderance in pressures established in the control chambers 43 and 44 responsively to introduction of a certain control current to the control winding 10 of the torque motor means 1, and that by reversing the pressure-preponderant condition in the control chambers 43 and 44 responsively to reversing the current in such control winding 10, the motor means 3 and hence the load mass may be caused to move in the opposite direction. The present servo valve system is one which is particularly suited for high performance operation where high speed alternating movement of load mass is desired, such as in actuation of a radar antenna, at a rate of alternation which exceeds the actual frequency of vibration of the system as including the load mass, the compliable linkage 51, the hydraulic fluid in the system which is also compliable to some extent, while maintaining a fidelity between the load mass velocity obtained and the input control conditions to the system, without undue lag.

This may be proven mathematically in the following manner:

PFB+VFB SERVO ANALYSIS

The spool valve-actuator transfer is:

(1)
$$\frac{C}{X} = \frac{k}{S\left(\frac{S^2}{\omega n^2} + \frac{2\zeta s}{\omega n} + 1\right)}$$

Spool forces are:

(2) $\quad F_d = P_d A_d$ (3) $\quad F_p = P_a A_f$ (4) $\quad F_v = P_v A_v$ (5) $\quad F_s = KX$ Summation of spool forces:
$$\Sigma F = 0$$
$$F_d - \overrightarrow{F_p} + F_v - F_s = 0$$

Where $F_s = KX$

Then:
$$X = \frac{F_d - F_p - F_v}{K}$$

(6)
$$\therefore X = \frac{P_d A_d - P_a A_f - P_v A_v}{K}$$

First stage dynamics:
$$q = aI - bP_d$$
$$q = A_d X_s$$
$$A_d X_s = aI - bP_d$$

(7)
$$P_d = \frac{aI}{b} - \frac{A_d X_s}{b}$$

Relationship between C and $F_p$:
$$P_a A = F$$
$$F = M\frac{d^2c}{dt^2} + B\frac{dc}{dt}$$
$$P_a A = MCS^2 + BCS$$
$$F_p = P_a A_f = A_f\left(\frac{MCS^2}{A} + \frac{BCS}{A}\right)$$

(8)
$$F_p = B\frac{A_f}{A}CS\left(\frac{M}{B}S + 1\right)$$

Relationship between C and $F_v$:
$$Q_v = A_t CS$$
$$P_v = Q_v R_h$$
$$P_v = A_t CS R_h$$

(9) $\quad F_v = P_v A_v = A_t A_v R_h CS$

Relation between C and $F_v$ with loading of velocity generator orifices (due to spool motion) considered Flow due to spool motion is:
$$Q_s = A_v XS$$

Flow due to tach motion is:
$$Q_v = A_t CS$$

Net flow into orifices is:
$$Q_o = Q_v - Q_s$$
$$P_v = Q_o R_h = R_h(Q_v - QS) = R_h(A_t CS - A_v XS)$$

(10)
$$P_v = A_v R_h\left(\frac{A_t}{A_v}CS - XS\right)$$

Using the above system equations, a block diagram as shown in FIG. 2 may be constructed. For simplification, neglect the effect of driving area ($A_d$) loading and also neglect the effect of velocity area ($A_v$) loading on the tachometer orifices. In other words, let the block $$\boxed{\frac{A_d}{b}s} = 0$$

and let $$\boxed{A_v R_h s} = 0$$

For design purposes these effects should not be neglected for they define the upper limit of system bandpass; however, for a simplified analysis to show the broad general principles it is fitting to omit them.

Reduction of the above block diagram, i.e. solution of the system equations, gives the following results:

Without PFB and VFB i.e., using conventional practice or flow control, the system transfer function is:

$$\frac{C}{I} = \frac{\frac{a}{b}\frac{k}{K}A_d}{S\left(\frac{S^2}{\omega_n^2} + \frac{2\zeta_s}{\omega_n} + 1\right)}$$

The use of VFB and PFB modifies this by introduction of $\alpha$ and $$\frac{k}{K}\frac{A_f}{A}M$$

as follows:

$$\frac{C}{I} = \frac{\frac{a}{b}\frac{k}{K}A_d \cdot \frac{1}{\alpha}}{\left(\frac{S^2}{\omega_n^2}\cdot\frac{1}{\alpha} + \left[\frac{2\zeta}{\omega_n} + \frac{k}{K}\frac{A_f}{A}M\right]\cdot\frac{1}{\alpha}S + 1\right)}$$

Where, $$\alpha = \left(\frac{k}{K}B\frac{A_f}{A} + \frac{k}{K}A_t A_v R_h + 1\right)$$

For the new quadratic:
$$\omega n_1 = \sqrt{\omega_n^2 \alpha} = \omega\sqrt{\alpha}$$

and $$\zeta 1 = \frac{\omega n_1}{\omega n}\zeta\frac{1}{\alpha} + \frac{\omega n_1}{2\alpha}\frac{k}{K}\frac{A_f}{A}M$$

This result indicates that $\omega n_1$ can be made higher than $\omega_n$ by adjusting loop gains. This shows that faster response is possible. $\zeta_1$ can also be adjusted so that a satisfactory degree of stability is possible.

Definition of symbols used in the above discussion:

$\alpha$ = Pressure loop gain+velocity loop gain+1
$a$ = Flow gain of the first stage; IN$^3$/SEC—MA
$A$ = Actuator piston area; IN$^2$
$A_d$ = Spool driving area; IN$^2$
$A_f$ = Spool area on which PFB acts; IN$^2$
$A_t$ = Area of velocity piston; IN$^2$
$A_v$ = Spool area on which VFB acts; IN$^2$
$b$ = Slope of first stage pres-flow characteristic; IN$^5$/SEC—LB
$B$ = Load damping; LB—SEC/IN
$C$ = Load displacement; IN
$F$ = Actuator force, LB
$F_d$ = Spool driving force due to PFB; LB
$F_p$ = Spool force due to PFB; LB
$F_s$ = Force on spool due to spool centering springs; LB $F_v$ = Spool force due to velocity feedback; LB
$I$ = Input current to first stage, MA
$k$ = Gain of valve-actuator combination; IN/SEC—IN
$K$ = Spool centering spring constant; LB/IN
$M$ = Load mass, LB—SEC$^2$/IN
$\omega_n$ = Natural Frequency due to load mass and compliances; Rad/Sec.
$\omega_{n_1}$ = Natural Frequency resulting when PFB+VFB is introduced; Rad/Sec.
$P_a$ = Actuator differential Pressure; LB/IN$^2$
$P_d$ = Spool driving pressure; LB/IN$^2$
$P_v$ = Differential pressure produced by motion of velocity piston; LB/IN$^2$
$q$ = First stage useful flow; IN$^3$/SEC
$Q_0$ = Net flow acting on velocity generator orifices; IN$^3$/SEC
$Q_s$ = Flow due to spool motion, IN$^3$/SEC
$Q_v$ = Flow pumped by velocity piston when in motion; IN$^3$/SEC
$R_h$ = Hydraulic resistance of velocity generator orifice pairs; LB—SEC/IN$^5$
$S$ = Laplace operator
$X$ = Valve spool displacement from center; IN
$\zeta$ = Damping factor of valve-actuator response; unitless
$\zeta_1$ = Damping factor after introduction of PFB+VFB
VFB = Abbreviation for velocity feedback
PFB = Abbreviation for pressure feedback The invention is not to be restricted to the specific structural details or arrangement of parts herein set forth except as defined by the claims, as various modifications thereof may be effected without departing from the spirit and scope of this invention.

I claim as my invention:

1. A servo valve system for controlling operation of fluid pressure actuator means including piston means operated by pressure of fluid in actuator chamber means and adapted for operative connection to a load, said system comprising valve means having delivery chamber means for fluid pressure connection to said actuator chamber means to control pressurization thereof, input control means for applying an input control condition to said valve means according to velocity of said load desired to be obtained, load pressure feedback means for fluid pressure connection to said actuator chamber means to apply an actuator-chamber-pressure feedback condition to said valve means in opposition to said input control means for stabilizing the system against hunting and oscillation, and velocity feedback means connected to said load to apply a load-velocity feedback condition to said valve means in opposition to said input control means to enable pressurization of said actuator means according to load velocity.

2. A servo valve system for controlling operation of fluid pressure actuator means including piston means operated by pressure of fluid in actuator chamber means and adapted for operative connection to a load, said system comprising valve means having delivery chamber means for fluid pressure connection to said actuator chamber means to control pressurization thereof, input control means for applying an input force to said valve means for effecting pressurization of said actuator means to obtain a load velocity proportionate to said input force, velocity feedback means adapted to be operably connected to said load for applying force to said valve means opposing said input force in direct proportion to load velocity to enable rapid acceleration of said load to its desired velocity while acting in behalf of preventing overshoot of such velocity, and pressure feedback means for fluid pressure connection to said actuator chamber means for applying force to said valve means opposing said input force in direct proportion to the degree of pressurization of said actuator chamber means to prevent oscillation of the system in the presence of compliances within such system.

3. A high performance servo valve system comprising a load to be actuated, fluid pressure operated actuator means, compliant linkage means operably connecting said actuator means to said load, piston valve means actuable to regulate actuating pressurization of said actuator means according to degree of piston valve means actuation, bias means urging said piston valve means toward a position for non-actuating pressurization of said actuator means, input control means for applying an input force to said valve means in opposition to said bias means, velocity feedback means operable by said load independently of said compliant linkage means to create a load velocity feedback pressure for applying a force to said piston valve means in opposition to said input force in direct proportion to load velocity, and pressure feedback means connected to said actuator means for applying a force to said piston valve means in opposition to said input force in direct proportion to the degree of actuation-inducing pressurization of said actuator means, in which system the tendency for oscillation due to the compliance of the fluid medium employed and of the compliant linkage means is overcome and whereby such system is rendered capable of reversible operation at frequencies greater than the natural frequency of the system due to mass of said load and such compliances.

4. In a servo valve system having valve means for controlling pressurization of a fluid pressure differential actuator driving a load according to an input control force, a pressure differential across said actuator, and a velocity-pressure differential proportionate to the velocity of said load; the combination of a piston valve assemblage comprising a center land movable reciprocably relative to a fluid pressure supply port to selectively communicate same to one or the other of two delivery chambers at its opposite ends adapted for fluid pressure connection to opposite sides of said actuator and to establish a degree of opening between said supply port and a particular delivery chamber according to the extent of such center land movement, a pair of lands of greater diameter than said center land connected for movement in unison therewith and disposed at its opposite sides, the center-land-adjacent end of each of said pair of lands being exposed to a respective one of said delivery chambers to establish a pressure feedback force relationship with respect thereto, each of said pair of lands cooperating with a respective fluid pressure release port for uncovery to a respective delivery chamber when the opposite delivery chamber is open to said supply port in degree proportionate to degree of supply port uncovery, the opposite ends of said pair of lands being exposed to respective control chambers in which a pressure differential may be established for control input to the piston valve assemblage, spring means biasing the piston valve assemblage toward a position in which said delivery chambers are closed to said supply port and to the respective release ports, and a pair of velocity feedback piston members connected to the aforesaid opposite ends of said pair of lands, respectively, said velocity feedback piston members being subject on their projecting ends to pressure of fluid in respective velocity-feedback-pressure chambers between which a pressure differential proportionate to load velocity is established.

5. In a servo valve system, means for producing a pressure differential which is directly proportional to velocity of an actuated member, said means comprising movable abutment means operable by said actuated member, casing means cooperable with said movable abutment means to define respective pressure chambers at its opposite sides, respective inlet flow restricting means via which said chambers are connected to a source of hydraulic fluid under pressure, respective outlet flow restricting means via which said chambers are connected to a hydraulic fluid return, and respective conduit means for sensing the pressures of fluid in said chambers.

(References on following page)

References Cited in the file of this patent

UNITED STATES PATENTS

| | | |
|---|---|---|
| 1,918,424 | Pontow et al. | July 18, 1933 |
| 2,478,183 | Drake | Aug. 9, 1949 |
| 2,616,397 | Ruud et al. | Nov. 4, 1952 |
| 2,623,503 | Parker | Dec. 30, 1952 |
| 2,623,504 | Rodeck et al. | Dec. 30, 1952 |
| 2,637,303 | Antron | May 5, 1953 |
| 2,889,815 | Lloyd | June 9, 1959 |

FOREIGN PATENTS

| | | |
|---|---|---|
| 423,676 | Germany | Jan. 8, 1926 |
| 570,487 | Great Britain | July 10, 1945 |